(12) United States Patent
Stephens et al.

(10) Patent No.: US 7,804,762 B2
(45) Date of Patent: Sep. 28, 2010

(54) METHOD AND APPARATUS FOR IMPLEMENTING DOWNLINK SDMA IN A WIRELESS NETWORK

(75) Inventors: Adrian P. Stephens, Cambridge (GB); Qinghua Li, Sunnyvale, CA (US); Minnie Ho, Los Altos, CA (US)

(73) Assignee: Intel Corporation, Santa Clara, CA (US)

( * ) Notice: Subject to any disclaimer, the term of this patent is extended or adjusted under 35 U.S.C. 154(b) by 1351 days.

(21) Appl. No.: 10/749,175

(22) Filed: Dec. 30, 2003

(65) Prior Publication Data
US 2005/0147023 A1    Jul. 7, 2005

(51) Int. Cl.
*H04J 11/00* (2006.01)
(52) U.S. Cl. .................. 370/208; 370/203; 370/207
(58) Field of Classification Search .................. None
See application file for complete search history.

(56) References Cited

U.S. PATENT DOCUMENTS

| | | | |
|---|---|---|---|
| 6,026,304 A * | 2/2000 | Hilsenrath et al. ....... | 455/456.2 |
| 6,185,440 B1 * | 2/2001 | Barratt et al. ............ | 455/562.1 |
| 6,240,098 B1 | 5/2001 | Thibault et al. | |
| 6,400,699 B1 | 6/2002 | Airy et al. | |
| 2002/0181492 A1 * | 12/2002 | Kasami et al. ............... | 370/445 |
| 2003/0081575 A1 * | 5/2003 | Lim et al. .................... | 370/335 |
| 2003/0128658 A1 | 7/2003 | Walton et al. | |
| 2005/0111599 A1 * | 5/2005 | Walton et al. ............... | 375/347 |
| 2005/0141407 A1 * | 6/2005 | Sandhu ........................ | 370/203 |

FOREIGN PATENT DOCUMENTS

WO    WO-02093819 A1    11/2002

* cited by examiner

*Primary Examiner*—Raj Jain
(74) *Attorney, Agent, or Firm*—Grossman, Tucker, Perreault & Pfleger, PLLC (57) ABSTRACT

Methods and structures are disclosed for use in implementing downlink spatial division multiple access (SDMA) in a wireless network. In at least one embodiment, a number of orthogonal sets of user devices are first identified within a coverage area. One of the identified orthogonal sets may then be selected based on a predetermined selection criterion. An SDMA exchange may then be initiated for the selected orthogonal set.

23 Claims, 10 Drawing Sheets

METHOD AND APPARATUS FOR IMPLEMENTING DOWNLINK SDMA IN A WIRELESS NETWORK

FIELD OF THE INVENTION

The invention relates generally to wireless communications and, more particularly, to wireless networking.

BACKGROUND OF THE INVENTION

Spatial division multiple access (SDMA) is a multiple access technique that uses spatial separation between antenna beams to allow multiple users to simultaneously use a common wireless channel. In one possible application, SDMA may be used to achieve an increase in overall throughput in a wireless network. To implement SDMA in a wireless network, however, techniques and structures for providing downlink SDMA in such a network need to be developed.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In a cell of a wireless network (e.g., a basic service set (BSS) in a wireless network following the IEEE 802.11 wireless networking standard (ANSI/IEEE Std 802.11-1999 Edition and progeny), etc.), a wireless access point (AP) may be used to provide wireless access to the network for one or more wireless user devices (e.g., "stations" or "STAs" in the IEEE 802.11 standard, etc.). The word "downlink" refers to the link or links from the AP to the user device(s). The word "uplink" refers to the link or links from the user device(s) to the AP. When spatial division multiple access (SDMA) is being implemented within a cell of a wireless network, multiple user devices may be able to communicate with the wireless AP concurrently on the same wireless channel. This can be accomplished by using a separate antenna beam of the AP to provide a link with each of the multiple user devices. If there is an adequate level of isolation between the antenna beams, then interference between the user links can be kept low.

Figure 1:
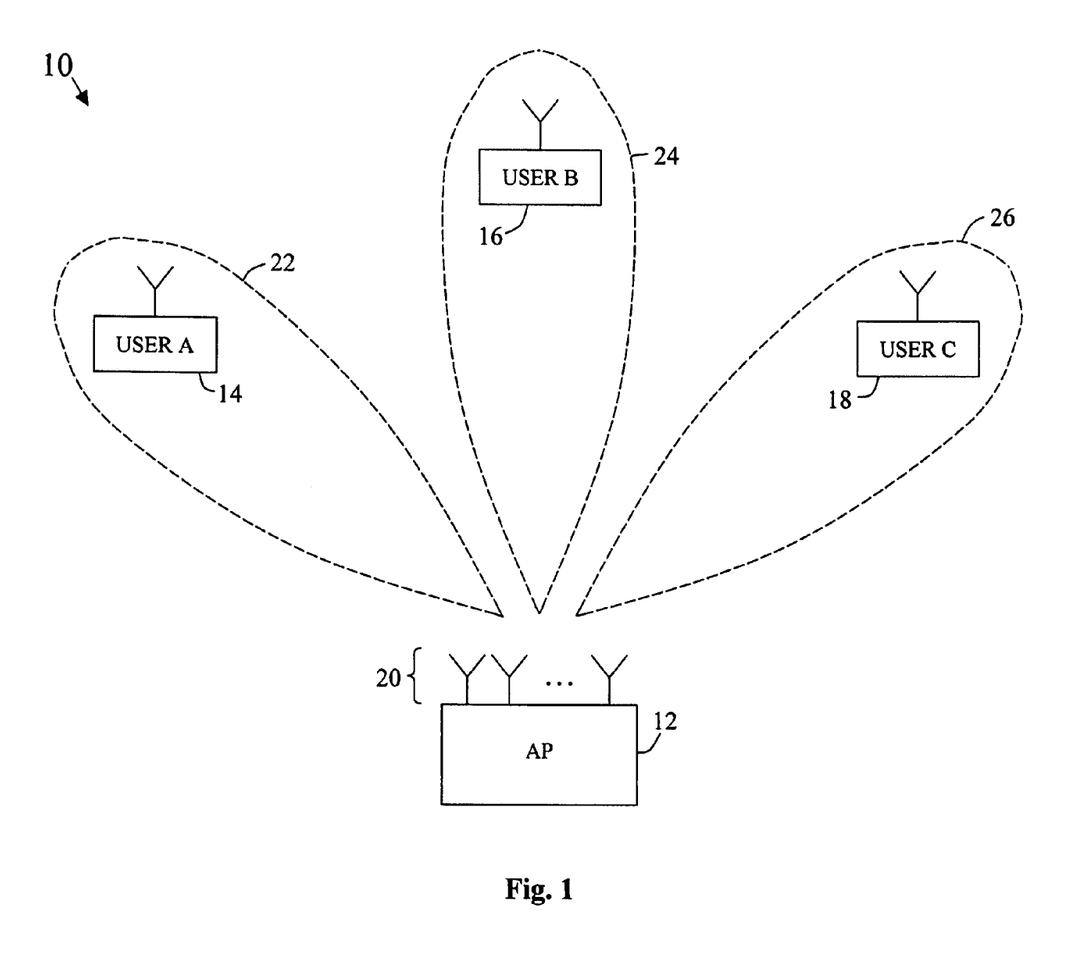
FIG. 1 is a diagram illustrating an exemplary use of SDMA within a cell of a wireless network in accordance with an embodiment of the present invention.

FIG. 1 is a diagram illustrating an exemplary use of SDMA within a cell of a wireless network in accordance with an embodiment of the present invention. As illustrated, a wireless AP 12 is communicating simultaneously with three user devices (USER A, USER B, USER C) 14, 16, 18 within a cell on a common channel. The wireless AP 12 communicates with a first user device 14 using a first antenna beam 22, with a second user device 16 using a second antenna beam 24, and with a third user device 18 using a third antenna beam 26. As shown, the first, second, and third antenna beams 22, 24, 26 are spatially separated from one another. Because of this spatial separation, and the isolation it provides, there may be relatively little interference between the beams, even when the same channel is used to communicate with each of the three user devices 14, 16, 18. As shown in FIG. 1, the AP 12 may have a plurality of antenna elements 20 for use in generating the antenna beams 22, 24, 26. Any number or configuration of antenna elements may be used. In at least one embodiment, phased array techniques may be used to generate the various antenna beams.

Figure 2:
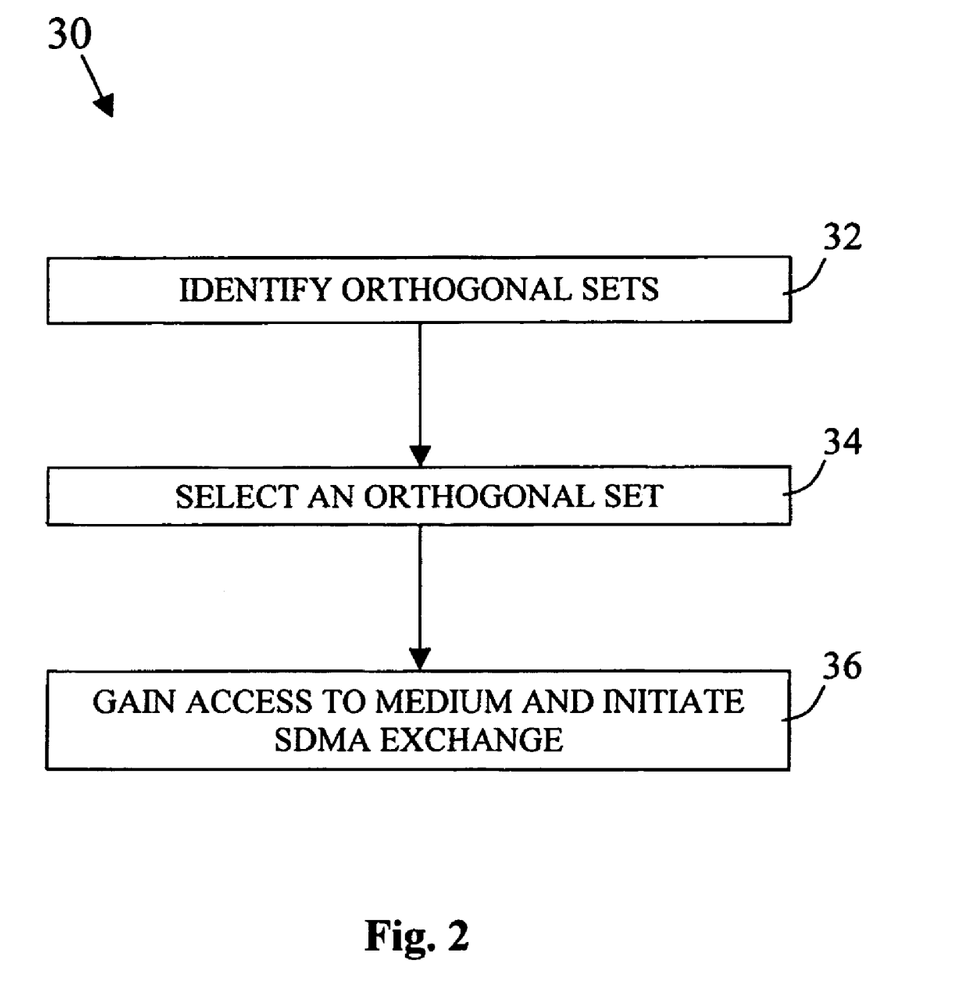
FIG. 2 is a flowchart illustrating an example method for use in providing downlink SDMA in a wireless network in accordance with an embodiment of the present invention.

FIG. 2 is a flowchart illustrating an example method 30 for use in providing downlink SDMA in a wireless network in accordance with an embodiment of the present invention. First, a number of orthogonal sets of user devices are identified by an AP (block 32). Then, one of the identified orthogonal sets is selected for communication (block 34). The AP may then gain access to the wireless medium and initiate an SDMA exchange with the user devices in the selected orthogonal set (block 36). An orthogonal set is a group of user devices within a cell that can be communicated with simultaneously by a corresponding AP using separate antenna beams. That is, there is an adequate level of isolation between the associated beams to allow concurrent communication with each of the user devices in the set. At a particular point in time, there may be a number of different configurations that are possible for servicing multiple users simultaneously. For example, suppose that there are four user devices (A, B, C, and D) that are active within a cell and that user devices C and D are so close to one another that it is impossible to generate a beam for one of them that does not include the other. Also suppose that separate antenna beams can be generated for user devices A and B. In this situation, a first orthogonal set may include user devices A, B, and C and a second orthogonal set may include user devices A, B, and D. Many other scenarios also exist. As will be appreciated, the manner for defining the orthogonal sets may depend on a number of different factors including, for example, the number of simultaneous beams that are possible, the steerability of the beams, the adjustability of the shape of the beams (e.g., beamwidth, etc.), the locations of the user devices in the cell, the number of active user devices in the cell, the motion of the user devices (if any), and/or other factors.

When using phased array antenna technology, each antenna beam that is generated for use in communicating will typically have one or more undesirable side lobes in directions other than the direction of the main beam. Nulls will exist between the main beam and the various side lobes (and also between adjacent side lobes). The nulls represent areas where little or no radiation is present. In selecting a beam position to use with a particular user device in an SDMA system, an antenna beam may be steered to a position where the particular user device is somewhere within the main beam (although not necessarily at the maximum gain position) and the nulls of the beam are in the directions of other user devices in the cell. Antenna beam positions may be selected for other user devices in the cell in a similar fashion. By aligning the nulls of an antenna pattern in the direction of other user devices, a high degree of isolation may be achieved. Orthogonal sets may be identified based on antenna beam positions selected in this fashion.

After orthogonal sets have been identified, as described above, an orthogonal set is selected from the identified sets for use in communicating (block 34). A predetermined selection criterion may be provided for making the selection. Each of the user devices within a cell may have data buffered within the AP for transmission to the user device. In at least one embodiment of the present invention, the amount of data that is buffered for delivery to the user devices within each orthogonal set may be used as part of the criterion for selecting an orthogonal set. In one possible approach, for example, a maximum duration for a subsequent SDMA exchange is first determined. Each of the identified orthogonal sets may then be analyzed to determine how much data is buffered for each user device in the set, up to the chosen duration. The total amount of this data for an orthogonal set is referred to as the "transmit size" of the orthogonal set. An orthogonal set that has the highest transmit size may then be chosen for communication. Other factors may also (or alternatively) be considered in the orthogonal set selection criterion such as, for example, latency, quality of service (QOS), fairness, and/or others. For example, in one approach, orthogonal sets that have users with a high QOS rating may be given priority over orthogonal sets that have users with a low QOS rating. A QOS score may be generated for each orthogonal set for use in making the selection. Also, it may be desirable that an orthogonal set be selected that has a similar amount of data buffered for each user in the set, rather than having large differences in the buffered data amount. The length of time that data has been buffered, or the amount of time remaining in any transmission deadline, may also be taken into consideration.

After an orthogonal set has been selected, the AP may gain access to the wireless medium and initiate an SDMA exchange for the selected set (block 36). To gain access to the medium, the AP may simply wait for the medium to be free and then initiate a backoff interval. Other techniques may alternatively be used. The SDMA exchange will typically include a transfer of data from the AP to the user devices within the selected orthogonal set (using separate antenna beams) and a transfer of acknowledgement (ACK) signals from the user devices back to the AP to acknowledge that the corresponding data was received. Two considerations that may be addressed in determining how to perform the SDMA exchange are the near-far problem and timing alignment concerns. The near-far problem relates to the reception of signals in the AP from the user devices within the orthogonal set. If the received user signals have widely varying power levels (e.g., if some of the user devices are close to the AP and others are far away), then it may be difficult to detect and decode the weaker received signals. Timing alignment relates to the fact that the AP may not be capable of transmitting and receiving at the same time. Therefore, the transmissions and receptions within a cell may need to be aligned in time in some manner.

A training exchange may also be performed as part of an SDMA exchange to achieve updated information about, for example, the user devices within the selected orthogonal set (e.g., to obtain information about the corresponding SDMA channels, etc.). Training may not be necessary every time that data is to be transmitted to user devices by a wireless AP. That is, in many cases, the relevant information will change slowly in the network so that updates can be made less frequently. However, some form of training will typically have to be done at least every so often so that the information used to, for example, generate the beams, select appropriate beams, communicate with the user devices, etc. is up to date. The training may be done as part of the SDMA exchange or during some other period. In at least one embodiment, a method (e.g., the method 30 of FIG. 2) is implemented as a series of instructions, stored on a storage medium, that can be executed by a computing platform.

Figure 3:
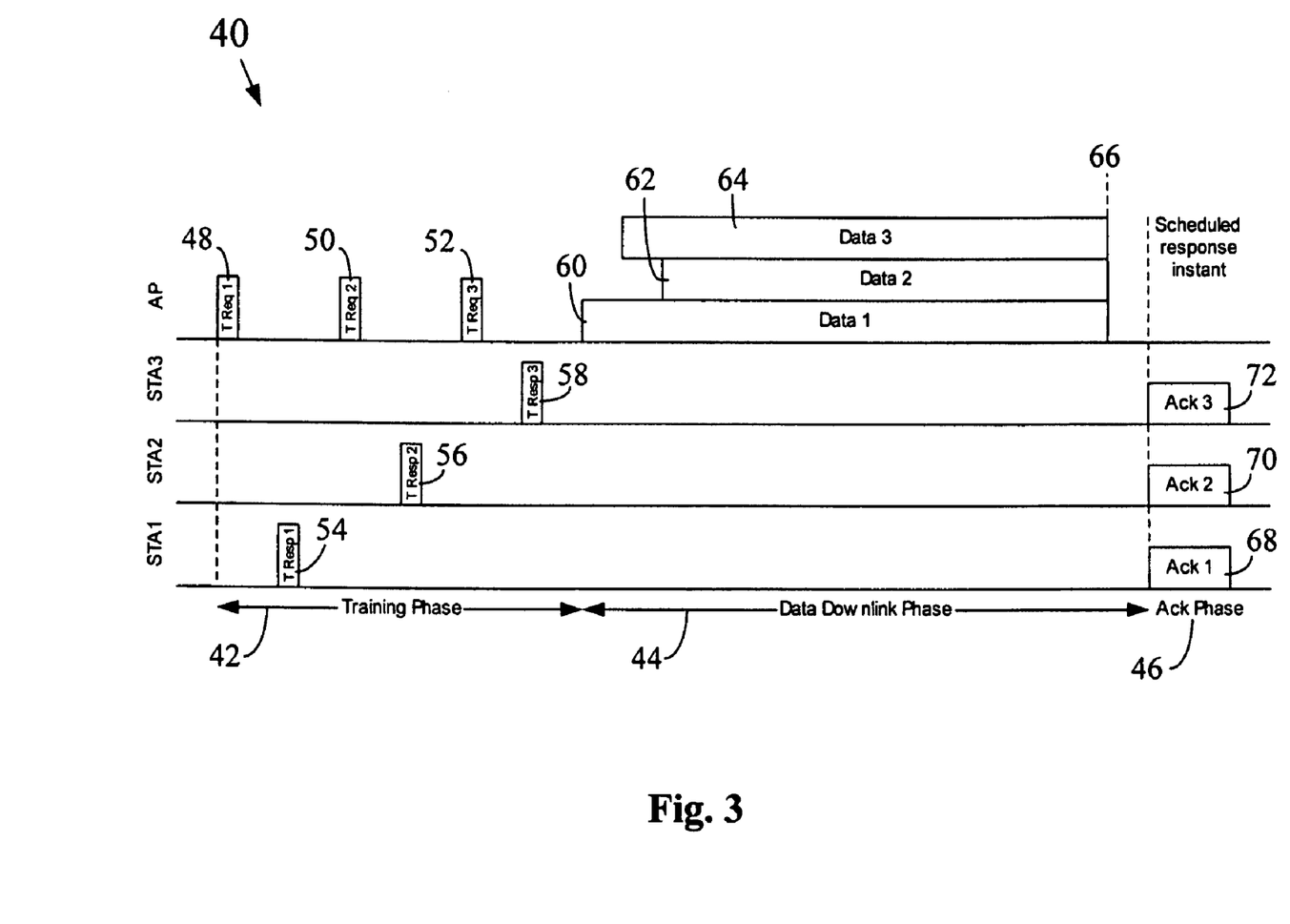
FIG. 3 is a timing diagram illustrating an example SDMA exchange in accordance with an embodiment of the present invention.

FIG. 3 is a timing diagram illustrating an example SDMA exchange 40 in accordance with an embodiment of the present invention. As shown, the SDMA exchange 40 includes three distinct phases: a training phase 42, a data downlink phase 44, and an acknowledgement phase 46. As described above, the training phase 42 may be optional. During the training phase 42, a training request may be delivered to each of the user devices (e.g., STA 1, STA 2, and STA 3 in the embodiment of FIG. 3) in the selected orthogonal set. Each of the user devices will then return a training response to the AP. The training response can simply be, for example, an acknowledgement of the receipt of the training request. In another approach, the training response may include a number of training symbols for use in training the corresponding channel. In at least one implementation, it may be desirable to allow legacy user devices (e.g., a user device following IEEE 802.11a, g, etc.) to be part of an SDMA-based cell. In such a case, the training request may include any valid packet in the legacy protocol that solicits a response. For example, a zero-length (null) packet may be transmitted to each user device in the selected orthogonal set for which a legacy type ACK packet will be returned as the training response. Other types of training request and training response signals may alternatively be used.

With reference to FIG. 3, in the illustrated embodiment, a separate training request packet 48, 50, 52 is transmitted to each of the user devices in the selected orthogonal set. The user devices then each respond a predetermined amount of time after the corresponding request with a training response packet 54, 56, 58. In one approach, the training request packets 48, 50, 52 may each be transmitted using an omni-directional antenna beam (or other type of beam that encompasses most or all user devices within the corresponding cell) rather than the beam that has been chosen for the corresponding user device. The training request packets 48, 50, 52 may each include, for example, a medium reservation request that may be used to reserve the wireless medium for the duration of the SDMA data exchange. If the training request packets 48, 50, 52 were transmitted using the antenna beams chosen for the specific user devices within the selected orthogonal set, then the medium reservation request information in the packets may not be received by all user devices in the cell (e.g., some devices may be located in nulls of the corresponding antenna patterns). Each of the training request packets 48, 50, 52 may include information identifying the particular user device that the corresponding training request is directed to. The user devices may be configured to respond a predetermined amount of time after such a request is received. During the training phase 42, it may become apparent that one or more of the user devices within the selected orthogonal set is no longer separable from the other user devices within the set. In such a case, one or more of the user devices may be dropped from the selected set. Alternatively, a new orthogonal set may be selected and used in the subsequent SDMA exchange.

In the data downlink phase 44 of the SDMA exchange 40 of FIG. 3, data 60, 62, 64 is transmitted to each of the user devices in the selected orthogonal set in a corresponding SDMA channel. That is, the data 60, 62, 64 may be transmitted to each corresponding user device in the orthogonal set using a separate antenna beam identified for that user device. In at least one embodiment of the present invention, as illustrated in FIG. 3, the data transmission to the user devices within the selected orthogonal set will be arranged so that the terminal ends of the transmitted data blocks 60, 62, 64 are aligned in time 66. The user devices may each be configured to transmit an ACK signal back to the AP after the end of the corresponding data transmission. By aligning the terminal ends of the data blocks 60, 62, 64, the ACK packets 68, 70, 72 received from the user devices will also be (at least approximately) aligned in time. In this manner, some degree of timing alignment between transmit and receive functions may be achieved in the cell. The above-described technique assumes that the amount of data to be transmitted to each user device in the selected set is known before the data downlink phase 44 starts (so that it is known when the transmission to each user device is to commence).

A separate receive beam will typically be used to receive an ACK packet from each of the user devices in the selected orthogonal set. In one possible approach, the same beam parameters may be used to receive an ACK signal from a user device that were used to transmit the corresponding data to the user device.

Figure 4:
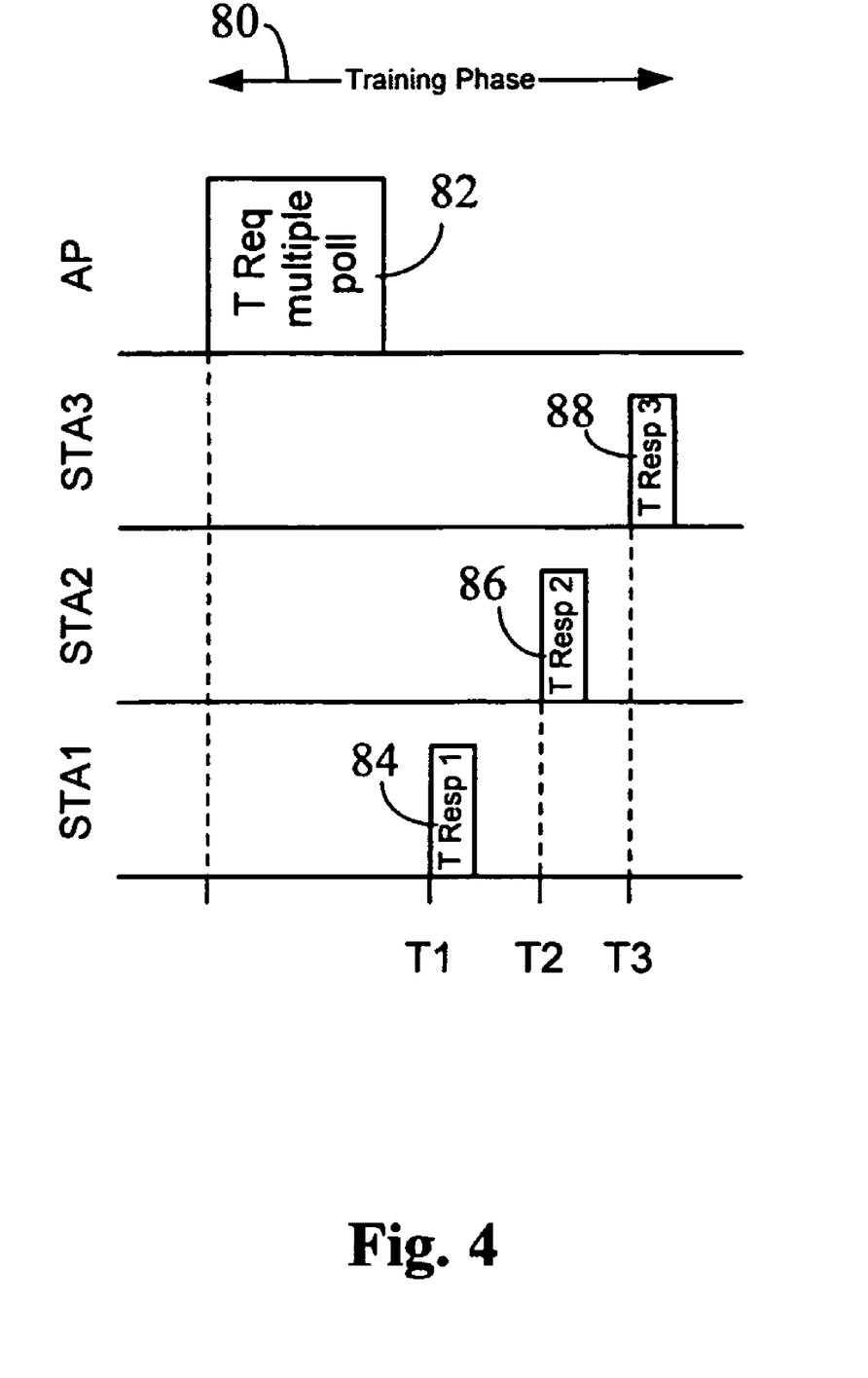
FIG. 4 is a timing diagram illustrating a training phase that may occur as part of an SDMA exchange in accordance with an embodiment of the present invention.

FIG. 4 is a timing diagram illustrating a training phase 80 that may be used within an SDMA exchange (or at some other time) in accordance with an embodiment of the present invention. As shown, a single multi-user training request packet 82 is transmitted to all of the user devices within the corresponding selected orthogonal set. The multi-user training request packet 82 may include information identifying the user devices from which a training response is being solicited. The multi-user training request packet 82 may also include timing information indicating times at which training response signals are to be transmitted by each of the identified user devices. As shown in the embodiment of FIG. 4, three user devices within the selected orthogonal set (i.e., STA 1, STA 2, and STA 3) transmit training response packets 84, 86, 88 at times T1, T2, and T3, respectively, in response to timing information within the multi-user training request packet 82. The multi-user training request packet 82 may also include a medium reservation request that may be used to reserve the wireless medium for the duration of the corresponding SDMA exchange. In at least one approach, the multi-user training request packet 82 may be transmitted using an omni-directional antenna beam (or other type of beam that encompasses most or all of the user devices within the corresponding cell).

Figure 5:
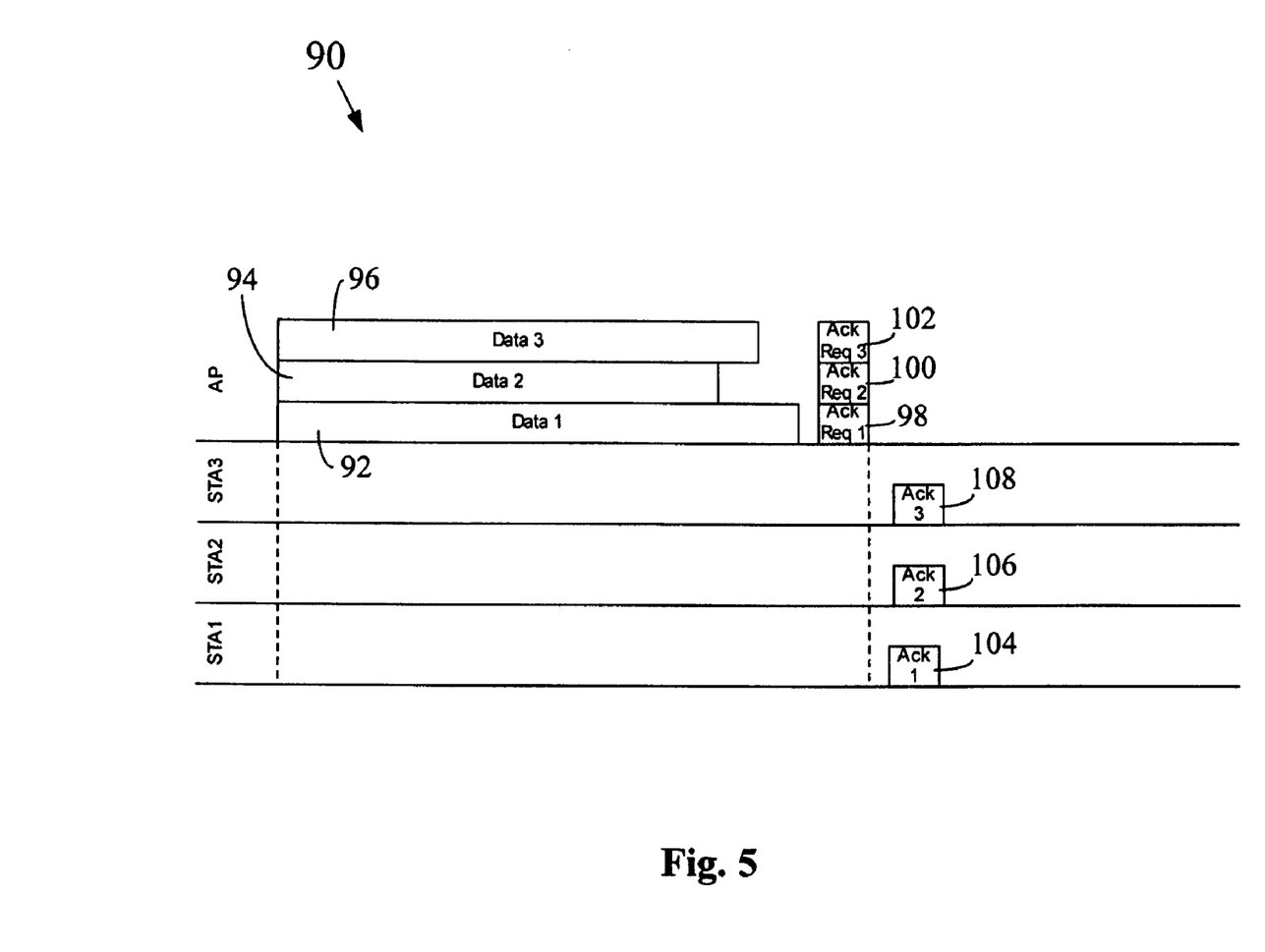
FIGS. 5, 6, 7, 8, and 9 are timing diagrams illustrating example SDMA exchanges in accordance with other embodiments of the present invention.

FIG. 5 is a timing diagram illustrating an example SDMA exchange 90 in accordance with an embodiment of the present invention. Although not shown, an optional training phase may also be included in the SDMA exchange 90 of FIG. 5. As before, data 92, 94, 96 may be transmitted to each user device within a selected orthogonal set using a separate antenna beam identified for that user device. However, instead of aligning the terminal ends of the data blocks 92, 94, 96 as in the previous embodiment to ensure proper timing alignment, a separate ACK request packet 98, 100, 102 may be transmitted to each of the user devices after the end of the corresponding data block 92, 94, 96. The ACK request packets 98, 100, 102 may be aligned in time. The client devices may each be configured to respond to an ACK request packet with an ACK packet 104, 106, 108 a predetermined amount of time after the request is received. Thus, the ACK packets 104, 106, 108 may also be aligned in time (at least approximately). In one possible approach, information may be included within the data blocks 92, 94, 96 that tells the corresponding user devices that separate ACK requests will be used and that ACK packets are not to be transmitted in response to the data block itself (for example, using the Block Ack protocol of IEEE 802.11e). The SDMA exchange 90 of FIG. 5 may be useful, for example, in a situation where the amount of data to be transmitted to each of the user devices in the selected orthogonal set is not known beforehand.

Figure 6:
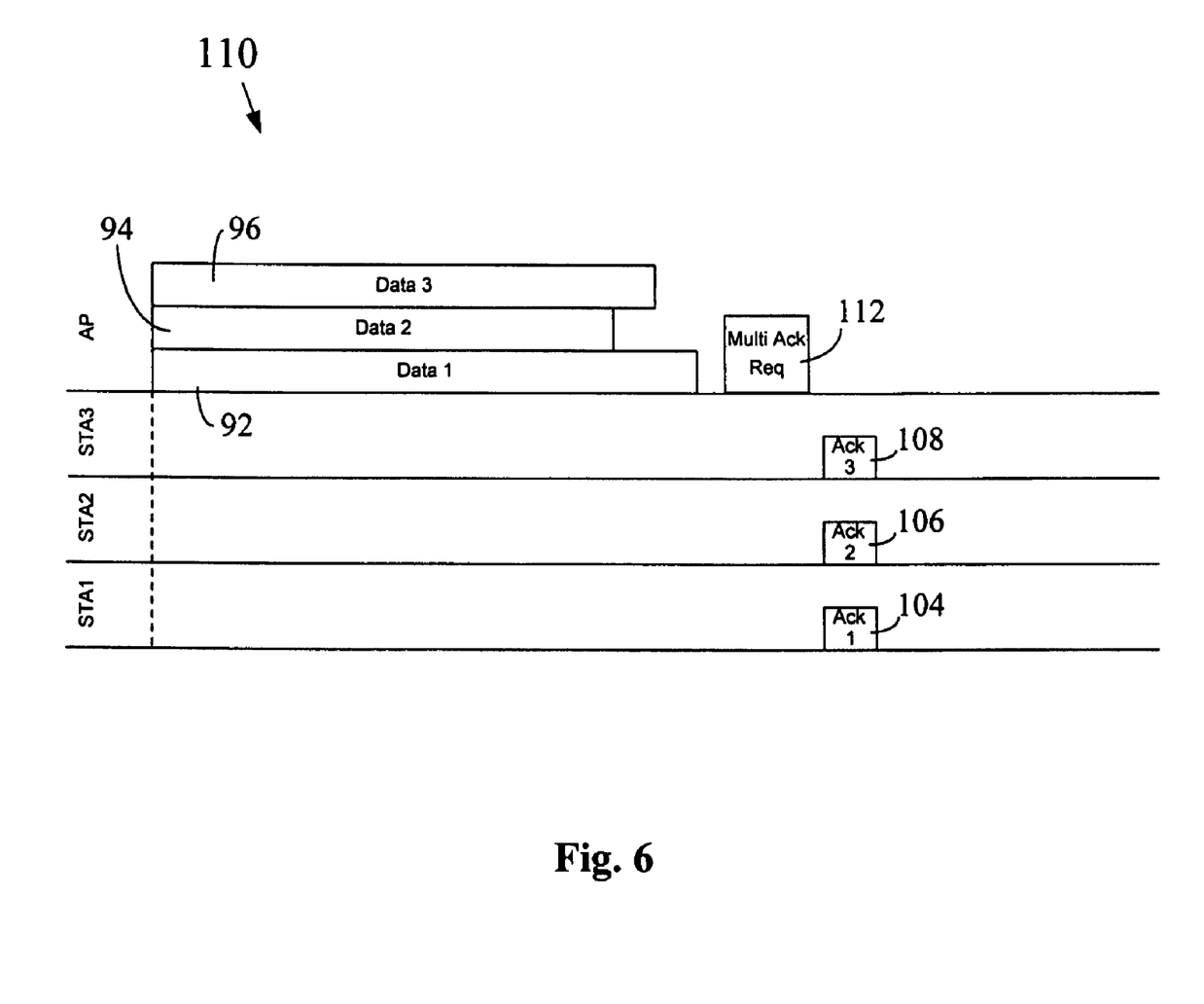

FIG. 6 is a timing diagram illustrating an example SDMA exchange 110 in accordance with an embodiment of the present invention. The SDMA exchange 110 of FIG. 6 is similar to the exchange 90 of FIG. 5 except that a single, multi-user ACK request 112 is transmitted to all of the user devices within the selected orthogonal set. The user devices may then each transmit a corresponding ACK packet 104, 106, 108 to the AP a predetermined amount of time after the multi-user ACK request 112. The multi-user ACK request 112 may include information identifying each of the user devices from which an acknowledgement is requested. In at least one implementation, the multi-user ACK request 112 may be transmitted using an omni-directional antenna beam (or other type of beam that encompasses all of the user devices within the selected orthogonal set).

Figure 7:
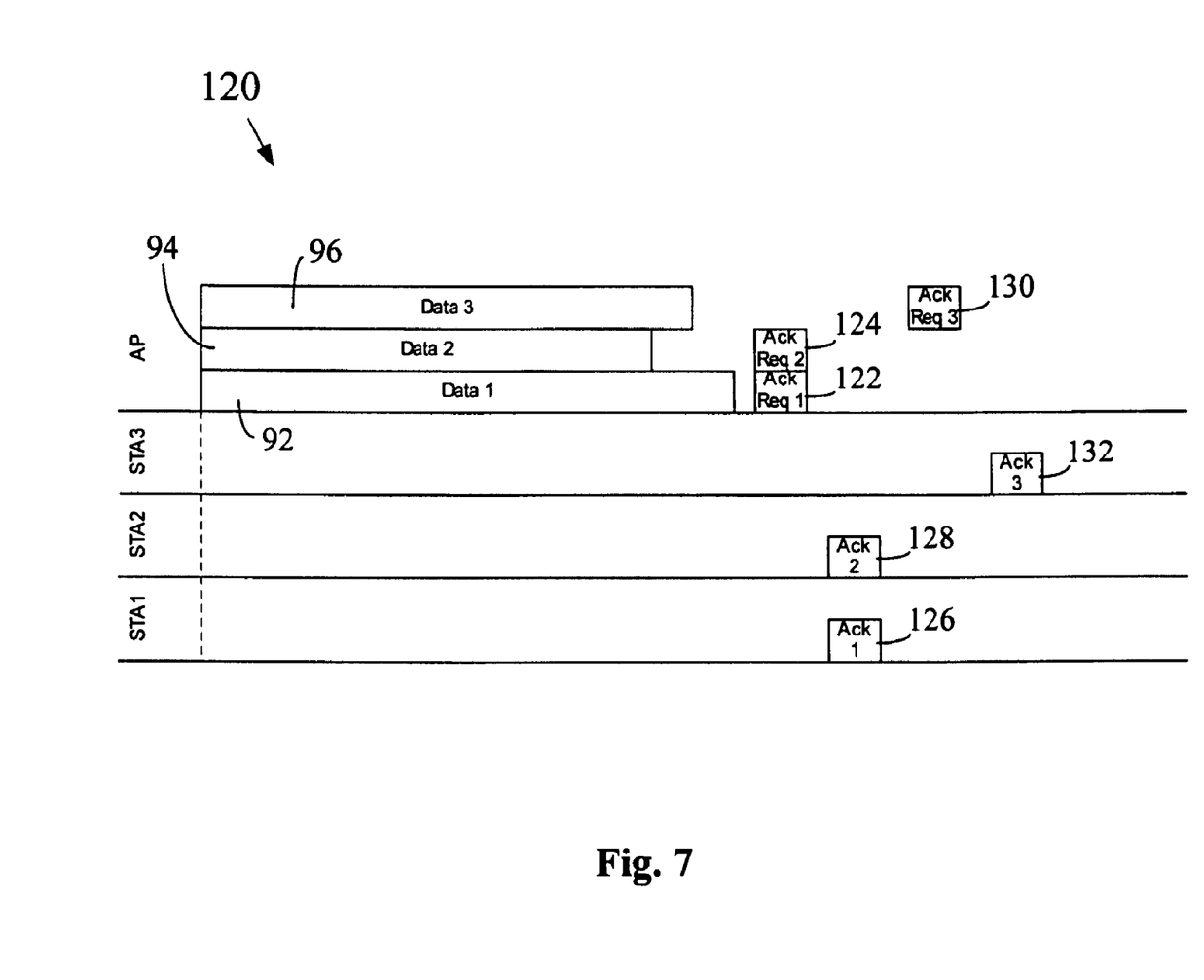

FIG. 7 is a timing diagram illustrating an example SDMA exchange 120 in accordance with an embodiment of the present invention. The SDMA exchange architectures described thus far have addressed transmit and receive timing alignment considerations, but did not address the near-far problem. The SDMA exchange architectures of FIGS. 7, 8, and 9, on the other hand, are capable of addressing both timing alignment and near-far concerns. Referring now to FIG. 7, instead of transmitting ACK request packets for all user devices within the selected orthogonal set at the same time (as in FIG. 5, for example), the AP may transmit ACK request packets to the user devices at different times based on, for example, a predicted resolvability of the resulting ACK packets to be received from the user devices. For example, it may be predicted that the ACK packets transmitted by some of the user devices within the selected orthogonal set will be resolvable when received concurrently within the AP while the ACK packets transmitted by one or more other user devices would not be. The packets that are predicted to be resolvable may then be received together, while the others may be received at a different time.

With reference to FIG. 7, for example, it may have been determined that ACK packets received concurrently from STA 1 and STA 2 will be resolvable within the AP. Thus, corresponding ACK request packets 122, 124 are transmitted at the same time to STA 1 and STA 2. STA 1 and STA 2 may then each transmit a corresponding ACK packet 126, 128 a predetermined amount of time later. It may also have been determined that an ACK packet associated with STA 3 would not be resolvable if received at the same time as the other ACK packets. Thus, the ACK request packet 130 for STA 3 is transmitted at a different time and the corresponding ACK packet 132 is received a predetermined amount of time later.

In effect, the selected orthogonal set has been further divided into multiple "receive" orthogonal sets based on the predicted resolvability of the corresponding received signals. Each of the receive orthogonal sets may include one or more user devices from the originally selected orthogonal set. The resolvability prediction may be based on any number of different factors including, for example, the receive power levels of the user devices in the selected orthogonal set, the signal-to-noise ratios (SNRs) associated with the user devices in the selected orthogonal set, the modulation type associated with the user devices in the selected orthogonal set, the coding types associated with the user devices in the selected orthogonal set, and/or other factors. In a relatively simple approach, only the receive power levels of the user devices are considered.

In a variation of the SDMA exchange 120 of FIG. 7, the three ACK request packets 122, 124, 130 may all be transmitted at the same time, but each will include timing information that indicates to the corresponding user device when it is to transmit an ACK packet. Thus, the ACK request packets 122 and 124 may each indicate the same time to corresponding user devices and ACK request packet 130 may indicate a different time.

Figure 8:
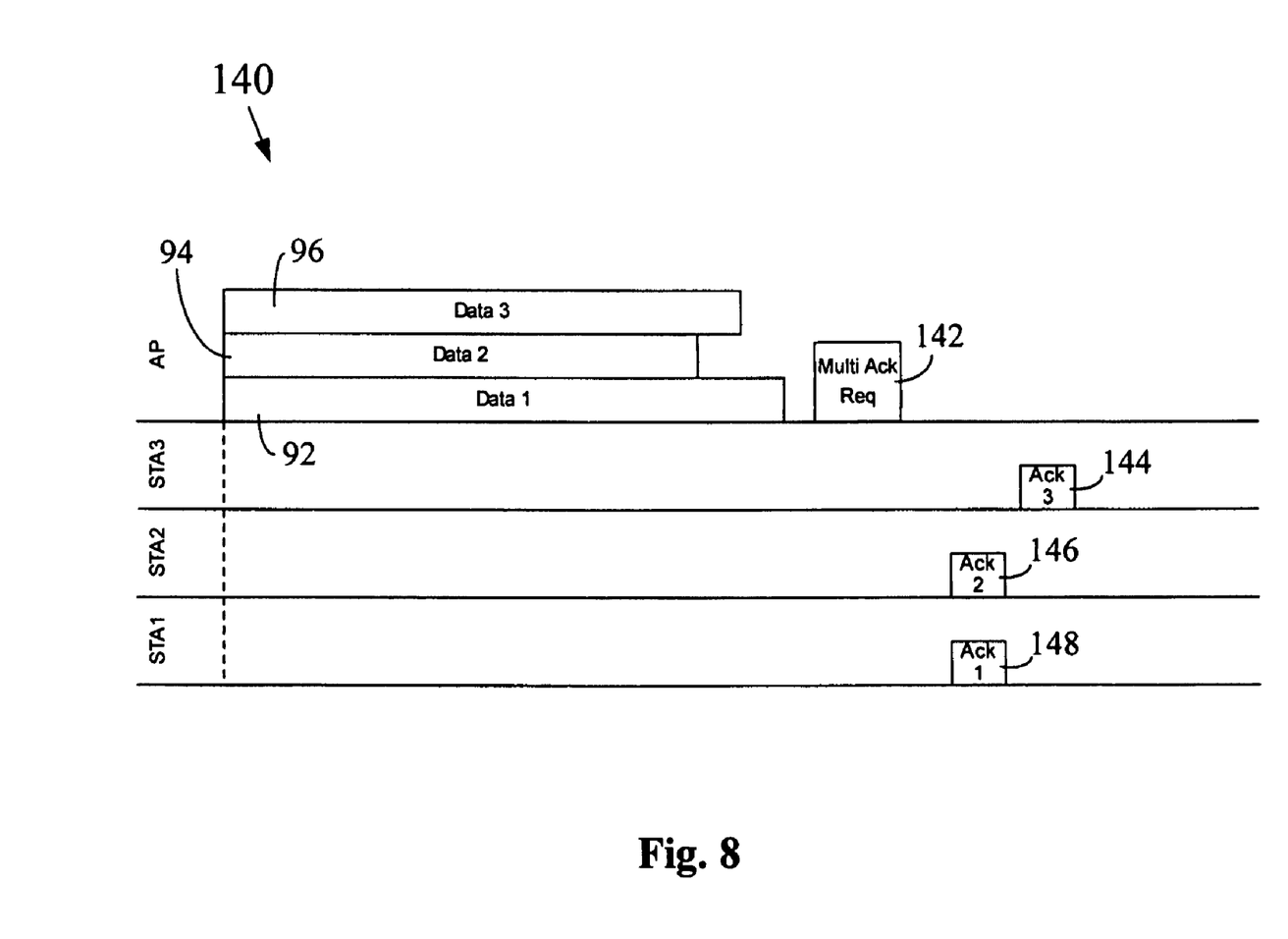

FIG. 8 is a timing diagram illustrating an example SDMA exchange 140 in accordance with an embodiment of the present invention. The SDMA exchange 140 of FIG. 8 is similar to the exchange 120 of FIG. 7, except that a single, multi-user ACK request packet 142 is transmitted to all of the user devices within the selected orthogonal set. The multi-user ACK request packet 142 includes timing information to indicate to the user devices within the selected orthogonal set when they are to transmit a corresponding ACK packet. The times indicated by the multi-user ACK request 142 may be based upon the predicted resolvability of the corresponding ACK packets upon reception, as described above. The multi-user ACK request 142 may be transmitted using, for example, an omni-directional antenna beam (or other type of beam that encompasses all of the user devices within the selected orthogonal set).

Figure 9:
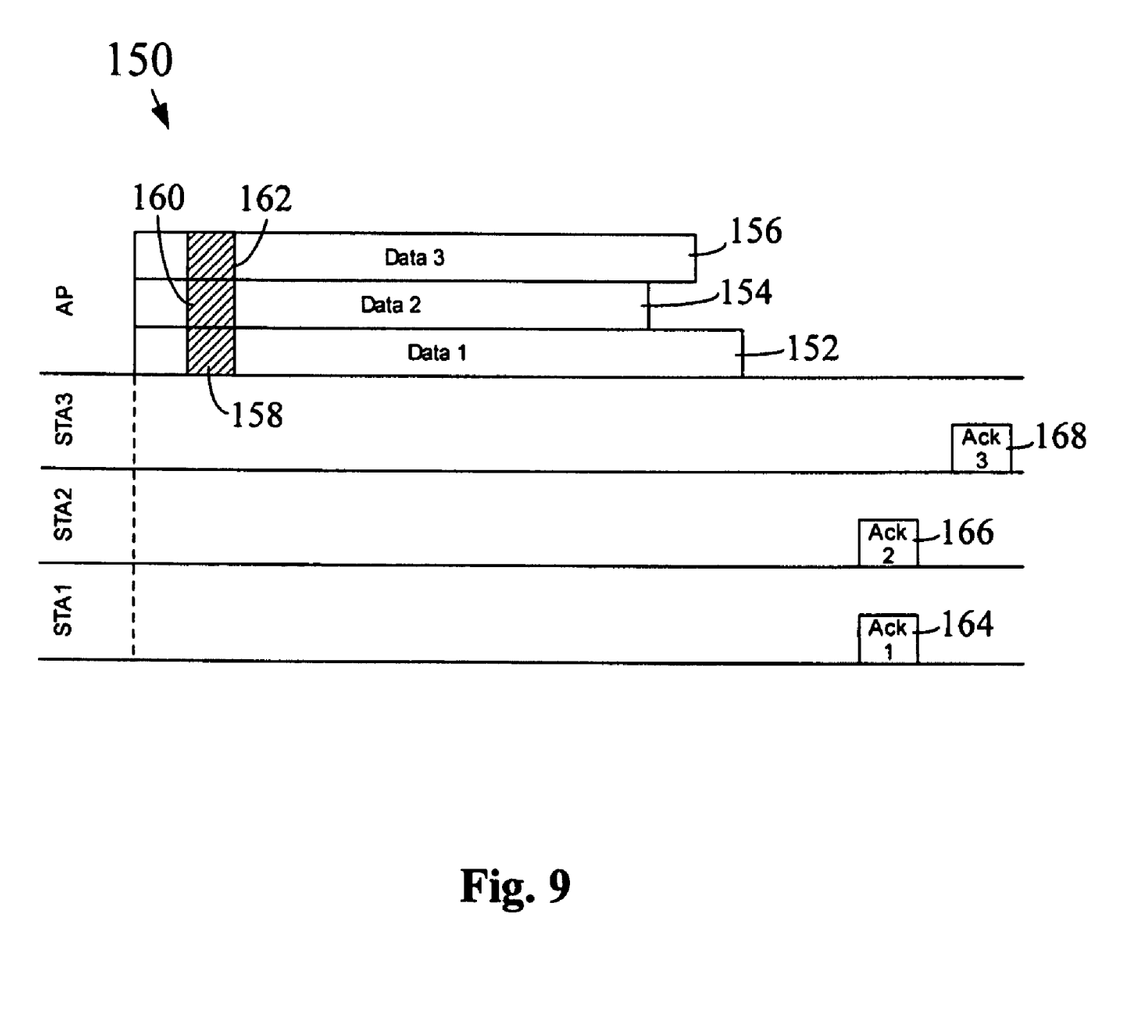

FIG. 9 is a timing diagram illustrating an example SDMA exchange 150 in accordance with an embodiment of the present invention. As illustrated, data 152, 154, 156 is transmitted to user devices within a selected orthogonal set using a separate beam for each of the user devices. Within the data 152, 154, 156 transmitted to each of the user devices is timing information 158, 160, 162 indicating a time at which the user device is to transmit an ACK packet back to the corresponding AP. The timing information 158, 160, 162 may be based upon the predicted resolvability of the corresponding ACK packets upon reception, as described above. The timing information 158, 160, 162 may be located anywhere within the corresponding transmitted data 152, 154, 156. Each of the user devices within the selected orthogonal set will subsequently transmit an ACK packet 164, 166, 168 to the AP at the indicated time.

Figure 10:
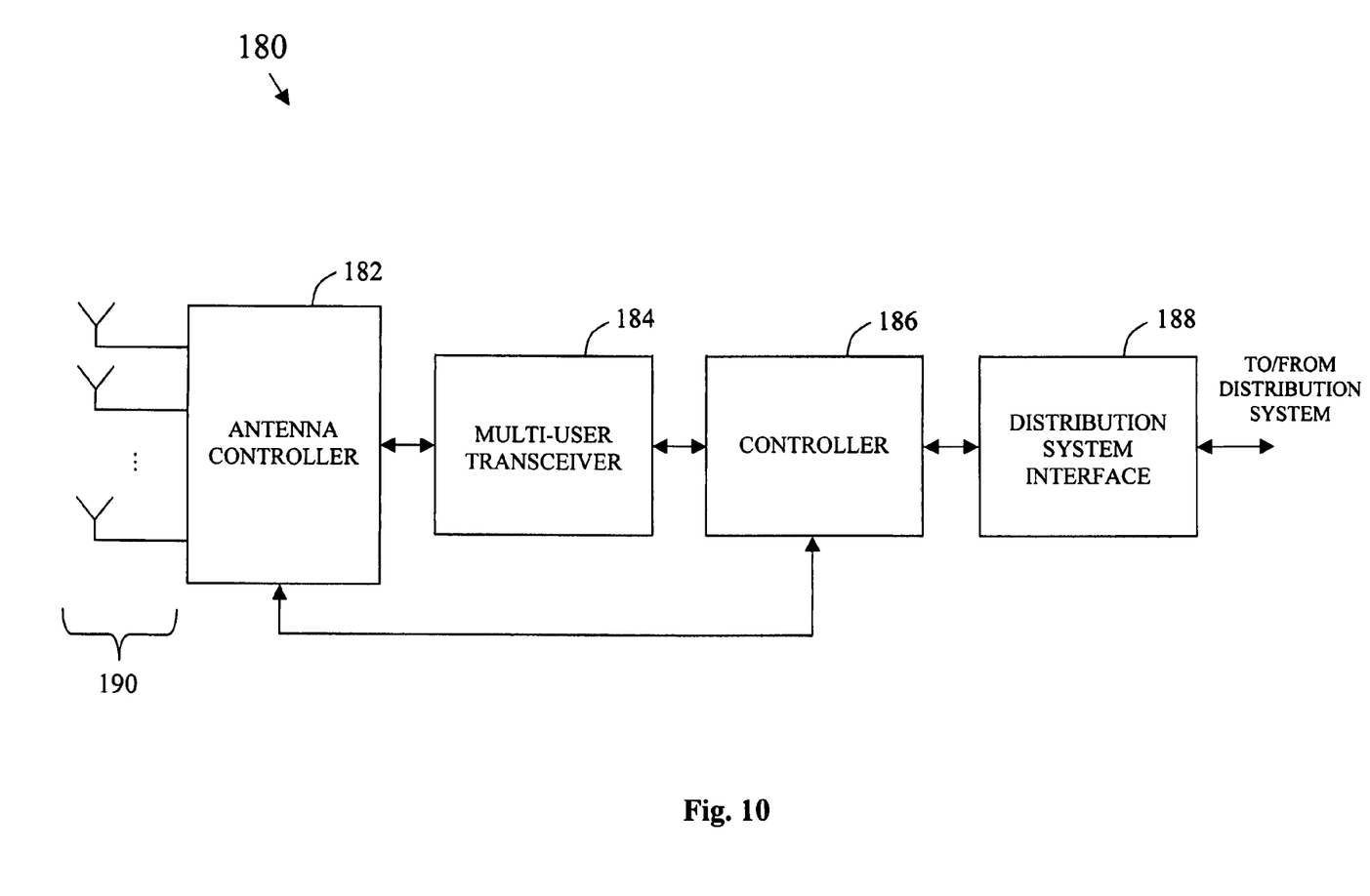
FIG. 10 is a block diagram illustrating an example SDMA-based wireless access point (AP) in accordance with an embodiment of the present invention.

FIG. 10 is a block diagram illustrating an example SDMA-based wireless access point (AP) architecture 180 in accordance with an embodiment of the present invention. As illustrated, the wireless AP 180 includes: a plurality of antennas 190, an antenna controller 182, a multi-user wireless transceiver 184, a controller 186, and a distribution system interface 188. The antenna controller 182 is operative for managing the generation of antenna beams (using the plurality of antennas 190) for use in communicating with wireless user devices in the associated network cell. The antenna controller 182 may include, for example, beamformer functionality for use in creating multiple independent antenna beams using the plurality of antennas 190. The multi-user wireless transceiver 184 includes receiver functionality for processing signals received by the plurality of antennas 190 and transmitter functionality for processing signals to be transmitted from the plurality of antennas 190. The multi-user wireless transceiver 184 is capable of servicing multiple users in the corresponding network cell simultaneously. That is, the multi-user wireless transceiver 184 may, for example, generate transmit signals for concurrent delivery to multiple users in the corresponding network cell using corresponding transmit antenna beams. The controller 186 controls the overall operation of the wireless AP 180. The controller 186 may be in direct communication with the antenna controller 182 to facilitate, for example, the selection and creation of antenna beams during transmit and/or receive operations. The controller 186 may be implemented using, for example, one or more digital processing devices. The distribution system interface 188 provides an interface between the wireless AP 180 and an external distribution system to allow communication with, for example, another access point, another portion of the same network, another network (e.g., the Internet, the public switched telephone network (PSTN), etc.), and/or others.

In at least one embodiment of the present invention, the controller 186 is configured to carry out the method 30 of FIG. 2 to support downlink SDMA in a corresponding network. The controller 186 may identify orthogonal sets of user devices using information gathered about currently active user devices in the cell. An orthogonal set may then be selected by the controller 186 based on a predetermined selection criterion. The controller 186 may then gain access to the network medium and cause an SDMA exchange to be initiated. In at least one embodiment of the present invention, the controller 186 may be configured to initiate an SDMA exchange such as those illustrated in FIGS. 3, 5, 6, 7, 8, and/or 9. The controller 186 may or may not perform SDMA training to gather SDMA channel information as part of the SDMA exchange. The controller 186 may also control a present mode (e.g., transmit mode or receive mode) of the multi-user wireless transceiver 184. For example, if the SDMA exchange 40 of FIG. 3 is being performed, the controller 186 may instruct the multi-user wireless transceiver 184 to change from transmit mode to receive mode after the end 66 of the data transmissions, but before the ACK signals 68, 70, 72 are scheduled to be transmitted. The controller 186 may also instruct the antenna controller 182 as to which antenna beam or beams to use. For example, if the SDMA exchange 110 of FIG. 6 is being performed, the controller 186 may instruct the antenna controller 182 to use the spatially separated antenna beams associated with the corresponding user devices when the data 92, 94, 96 is being transmitted and to use an omni-directional beam when the multi-user ACK request 112 is being transmitted. As will be appreciated, other control schemes and other AP architectures may alternatively be used.

In at least one embodiment, two or more of the blocks of FIG. 10 are implemented within digital processing devices. The digital processing devices may include, for example, a general purpose microprocessor, a digital signal processor (DSP), a reduced instruction set computer (R.ISC), a complex instruction set computer (CISC), a field programmable gate array (FPGA), an application specific integrated circuit (ASIC), and/or others, including combinations of the above.

In the above-described embodiments, the invention has been described using some terms that are commonly associated with the IEEE 802.11 wireless networking standard. It should be understood, however, that the inventive concepts are not limited to use within networks following the IEEE 802.11 standard. On the contrary, the inventive concepts may be implemented within wireless networks following any wireless networking standard.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
identifying a plurality of orthogonal sets of user devices in a cell of a wireless network, wherein each orthogonal set in said plurality of orthogonal sets includes multiple user devices that can be transmitted to concurrently by an access point using different antenna beams in a spatial division multiple access (SDMA) mode of operation;
selecting an orthogonal set from the plurality of orthogonal sets for use in transmitting data to the corresponding user devices based on a predetermined selection criterion; and
initiating, after selecting, an SDMA exchange for the selected orthogonal set;
wherein initiating an SDMA exchange includes:
simultaneously transmitting data to user devices in said selected orthogonal set using corresponding antenna beams; and
transmitting an acknowledgement (ACK) request to each user device in said selected orthogonal set after said data has been transmitted, wherein transmitting an ACK request includes transmitting a single multi-user ACK request using an antenna beam that encompasses all of said user devices in said selected orthogonal set, said single multi-user ACK request including time information indicative of a time at which each user device in said selected orthogonal set is to respond to said single multi-user ACK request, wherein said time information is determined based upon a predicted resolvability of signals received from said user devices within said selected orthogonal set.

2. The method of claim 1, wherein:
selecting an orthogonal set includes:
determining a maximum duration for the SDMA exchange;
evaluating orthogonal sets in said plurality of orthogonal sets to determine an amount of data that is buffered for said orthogonal sets; and
selecting an orthogonal set that has a largest amount of buffered data that can be delivered within said maximum duration of said SDMA exchange.

3. The method of claim 1, wherein:
selecting an orthogonal set includes using quality of service (QOS) information as part of said predetermined selection criterion.

4. The method of claim 1, wherein:
selecting an orthogonal set includes using latency related information as part of said predetermined selection criterion.

5. The method of claim 1, wherein:
initiating an SDMA exchange includes simultaneously transmitting data to user devices in said selected orthogonal set, using corresponding antenna beams, so that a terminal end of the data transmitted to each user device occurs at substantially the same time.

6. The method of claim 5, further comprising:
receiving acknowledgement (ACK) signals from said user devices in said selected orthogonal set after said data has been transmitted, wherein said ACK signals are received from said user devices at approximately the same time.

7. The method of claim 1, wherein:
initiating an SDMA exchange includes transmitting data to user devices in said selected orthogonal set using corresponding antenna beams, wherein said data transmitted to each of said user devices includes time information indicating a time at which the corresponding user device is to acknowledge the data.

8. The method of claim 1, wherein:
initiating an SDMA exchange includes transmitting a training request packet to a first user device within the selected orthogonal set.

9. The method of claim 8, wherein:
said training request packet is transmitted using an antenna beam that encompasses substantially an entire coverage region of the access point.

10. The method of claim 1, wherein:
initiating an SDMA exchange includes transmitting a multi-user training request packet to all of the user devices within said selected orthogonal set, wherein said multi-user training request packet is transmitted using an antenna beam that encompasses substantially an entire coverage region of the access point.

11. An access point (AP) for use in a wireless network implementing spatial division multiple access (SDMA), comprising:
a plurality of antenna elements;
a multi-user wireless transceiver, in communication with said plurality of antenna elements, to support wireless communication with multiple users within a coverage area of the AP using spatial division multiple access (SDMA); and
a controller, coupled to said multi-user wireless transceiver, to identify a number of orthogonal sets of user devices within the coverage area, to select one of the identified orthogonal sets for use in transmitting data to the corresponding user devices based on a predetermined selection criterion, and to initiate, after an orthogonal set has been selected, an SDMA exchange for the selected orthogonal set, wherein an orthogonal set is a set that includes multiple user devices that can be transmitted to concurrently by the access point using SDMA;
wherein said controller initiates said SDMA exchange by causing said multi-user wireless transceiver to transmit data to each of the user devices in said selected orthogonal set using a separate antenna beam for each user device;
wherein said controller causes said multi-user wireless transceiver to transmit an acknowledgement request to each of the user devices in said selected orthogonal set, using a separate antenna beam for each user device, after said data has been transmitted, wherein said controller causes said multi-user wireless transceiver to transmit acknowledgement requests to user devices in said selected orthogonal set at different times, wherein said different times are based upon a predicted resolvability of the resulting acknowledgement signals.

12. The AP of claim 11, further comprising:
an antenna controller, coupled to the multi-user wireless transceiver, to manage the generation of antenna beams for the AP.

13. The AP of claim 11, wherein:
said controller selects one of the identified orthogonal sets based, at least in part, on a maximum duration of a subsequent SDMA exchange.

14. The AP of claim 11, wherein:
said controller causes said data to be transmitted by said multi-user wireless transceiver so that a terminal end of the data transmitted to each of the user devices in said selected orthogonal set occurs at substantially the same time.

15. A non-transitory storage medium having instructions stored thereon to be executed by a processor, for: identifying a plurality of orthogonal sets of user devices in a cell of a wireless network, wherein each orthogonal set in said plurality of orthogonal sets includes multiple user devices that can be transmitted to concurrently by an access point using spatial division multiple access (SDMA); selecting an orthogonal set from the plurality of orthogonal sets for use in transmitting data to the corresponding user devices based on a predetermined selection criterion; and initiating, after selecting, an SDMA exchange for the selected orthogonal set; wherein initiating an SDMA exchange includes: simultaneously transmitting data to user devices in said selected orthogonal set using corresponding antenna beams; and transmitting an acknowledgement (ACK) request to each user device in said selected orthogonal set after said data has been transmitted, wherein transmitting an ACK request includes transmitting a separate ACK request to each user device in said selected orthogonal set using a corresponding antenna beam, said separate ACK requests being transmitted to corresponding user devices at different times, wherein said different times are selected based upon a predicted resolvability of signals received from said user devices within said selected orthogonal set.

16. The storage medium of claim 15, wherein:
initiating an SDMA exchange includes simultaneously transmitting data to user devices in said selected orthogonal set, using corresponding antenna beams, so that a terminal end of the data transmitted to each user device occurs at substantially the same time.

17. The storage medium of claim 15, wherein initiating an SDMA exchange includes:
simultaneously transmitting data to user devices in said selected orthogonal set using corresponding antenna beams; and
transmitting an acknowledgement (ACK) request to each user device in said selected orthogonal set after said data has been transmitted.

18. The storage medium of claim 15, wherein:
initiating an SDMA exchange includes transmitting data to user devices in said selected orthogonal set using corresponding antenna beams, wherein said data transmitted to each of said user devices includes time information indicating a time at which the corresponding user device is to acknowledge the data.

19. A system comprising:
a plurality of antenna elements that includes at least one dipole antenna element;
a multi-user wireless transceiver, in communication with said plurality of antenna elements, to support wireless communication with multiple users within a network coverage area using spatial division multiple access (SDMA); and
a controller, coupled to said multi-user wireless transceiver, to identify a number of orthogonal sets of user devices within the network coverage area, to select one of the identified orthogonal sets for use in transmitting data to the corresponding user devices based on a predetermined selection criterion, and to initiate, after an orthogonal set has been selected, an SDMA exchange for the selected orthogonal set, wherein an orthogonal set is a set that includes multiple user devices that can be transmitted to concurrently using SDMA;
wherein said controller initiates said SDMA exchange by causing said multi-user wireless transceiver to transmit data to each of the user devices in said selected orthogonal set using a separate antenna beam for each user device;
wherein said controller causes said multi-user wireless transceiver to transmit an acknowledgement request to each of the user devices in said selected orthogonal set, using a separate antenna beam for each user device, after said data has been transmitted, wherein said controller causes said multi-user wireless transceiver to transmit acknowledgement requests to user devices in said selected orthogonal set at different times, wherein said different times are based upon a predicted resolvability of the resulting acknowledgement signals.

20. The system of claim 19, further comprising:
an antenna controller, coupled to the multi-user wireless transceiver, to manage the generation of antenna beams using the plurality of antenna elements.

21. The system of claim 15, wherein: said controller causes said data to be transmitted by said multi-user wireless transceiver so that a terminal end of the data transmitted to each of the user devices in said selected orthogonal set occurs at substantially the same time.

22. A method comprising:
identifying a plurality of sets of user devices in a wireless network, wherein each set in said plurality of sets includes multiple user devices that can be transmitted to concurrently using different antenna beams in a spatial division multiple access (SDMA) mode of operation; and
initiating an SDMA exchange for a selected set in said plurality of sets, wherein initiating an SDMA exchange includes:
simultaneously transmitting data to user devices in said selected set using corresponding antenna beams; and
transmitting an acknowledgement (ACK) request to each user device in said selected set after said data has been transmitted, wherein transmitting an ACK request includes transmitting a separate ACK request to each user device in said selected set using a corresponding antenna beam, said separate ACK requests being transmitted to corresponding user devices at different times, wherein said different times are selected based upon a predicted resolvability of signals received from said user devices within said selected set.

23. A method comprising:
identifying a plurality of orthogonal sets of user devices in a cell of a wireless network, wherein each orthogonal set in said plurality of orthogonal sets includes multiple user devices that can be transmitted to concurrently by an access point using different antenna beams in a spatial division multiple access (SDMA) mode of operation; and initiating an SDMA exchange for a selected orthogonal set, wherein initiating an SDMA exchange includes:

simultaneously transmitting data to user devices in said selected orthogonal set using corresponding antenna beams; and transmitting an acknowledgement (ACK) request to each user device in said selected orthogonal set after said data has been transmitted, wherein transmitting an ACK request includes transmitting a single multi-user ACK request using an antenna beam that encompasses all of said user devices in said selected set, said single multi-user ACK request including time information indicative of a time at which each user device in said selected set is to respond to said single multi-user ACK request, wherein said time information is determined based upon a predicted resolvability of signals received from said user devices within said selected orthogonal set.

* * * * *